US007792911B2

(12) United States Patent
Wilson

(10) Patent No.: US 7,792,911 B2
(45) Date of Patent: Sep. 7, 2010

(54) E-MAIL UTILITY TO LOCK REPLY RECIPIENTS FIELD

(75) Inventor: Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/621,141

(22) Filed: Jan. 9, 2007

(65) Prior Publication Data

US 2008/0168269 A1    Jul. 10, 2008

(51) Int. Cl.
*G06F 13/00* (2006.01)
(52) U.S. Cl. .................................... 709/206
(58) Field of Classification Search ................ 709/206, 709/217, 219, 223, 225, 250
See application file for complete search history.

(56) References Cited

U.S. PATENT DOCUMENTS

| 6,480,885 | B1* | 11/2002 | Olivier ....................... 709/207 |
| 6,591,367 | B1  | 7/2003  | Kobata et al. |
| 6,633,630 | B1  | 10/2003 | Owens et al. |
| 6,999,565 | B1  | 2/2006  | Delaney et al. |
| 7,139,802 | B2  | 11/2006 | Keohane et al. |
| 2003/0233410 | A1* | 12/2003 | Gusler et al. ................ 709/206 |
| 2004/0049696 | A1* | 3/2004  | Baker et al. ................. 713/201 |
| 2006/0212523 | A1* | 9/2006  | Daniels et al. .............. 709/206 |
| 2007/0113101 | A1* | 5/2007  | LeVasseur et al. .......... 713/189 |

* cited by examiner

*Primary Examiner*—Viet Vu
(74) *Attorney, Agent, or Firm*—The Brevetto Law Group

(57) ABSTRACT

Methods and systems are provided for locking the reply recipients field of an e-mail to ensure that reply e-mails or forwarded e-mails include the original recipients of the e-mail. In some embodiments a reply e-mail or forwarded e-mail that does not include the locked recipients will be prevented from being sent. In other embodiments copies of the reply/forwarded e-mail will be sent to the locked recipients even though they do not appear on the distribution list.

18 Claims, 4 Drawing Sheets

E-MAIL UTILITY TO LOCK REPLY RECIPIENTS FIELD

BACKGROUND

1. Field

The present invention relates to electronic communication, and more specifically systems and methods of communicating via e-mail.

2. Background

Today e-mail is a widely accepted a form of communication in most businesses and households. The vast majority of people who own computers or have Internet access use e-mail to communicate on a regular basis. E-mails can be the primary source of communication for businesses. Group e-mails often take place during the course of work projects or in the planning of social events. An e-mail sent from one person may be forwarded to another group of people, or one of the recipients of the e-mail may reply to some of the other recipients, but not all of them. This can be a problem when the person who originally sent the e-mail wants to be included in further e-mail discussions involving the originally sent e-mail, or have the original group of recipients included in the discussions.

Using convention e-mail applications and systems, the sender of an e-mail has no control over being included on any reply e-mails or forwarded e-mails based on the sender's original e-mail. What is needed is an e-mail application that ensures the sender of an e-mail is included in any subsequent replies to the e-mail forwarded e-mails based on the sender's original e-mail.

SUMMARY

Embodiments disclosed herein address the above stated needs by providing systems, methods and computer software for locking a distribution list of a reply e-mail. In accordance with various embodiments a locked distribution list is associated to a first e-mail, and the first e-mail is sent to e-mail addresses on the locked distribution list. In some embodiments the first e-mail and the locked distribution list are configured so that a reply e-mail must include the locked distribution list or the reply e-mail is prevented from being sent. In other embodiments the reply e-mail is sent to the locked recipients even if they do not appear on the distribution list.

In some embodiments the locked distribution list may include only the sender of the first e-mail, while in other embodiments the locked distribution list includes some or all recipients of the first e-mail along with the sender. In at least one embodiment the sent e-mail, the reply e-mail, or both, may be labeled as having a locked distribution. In at least some embodiments the e-mail initially sent with the locked distribution list is encoded using an encryption key based on the locked distribution list. The sent e-mail must be decoded using the encryption key in order for a reply e-mail to be created.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
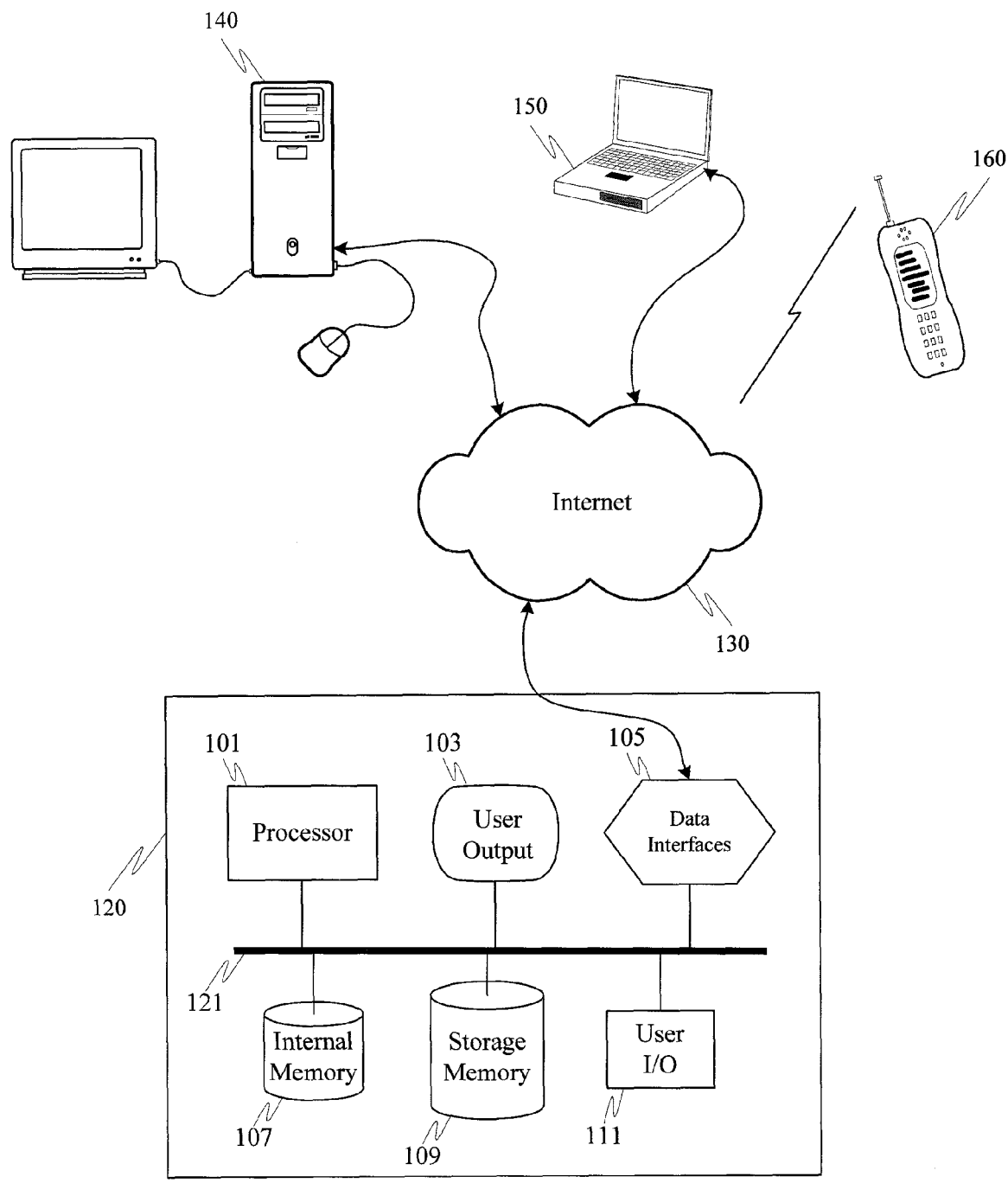
FIG. 1 depicts an exemplary system for practicing various embodiments of the invention.

FIG. 1 depicts an exemplary system 100 for practicing various embodiments of the invention. FIG. 1 shows a desktop computer system 140, a notebook computer 150 (sometimes called a laptop) and a wireless device 160 which may be embodied as a cellular telephone, a two-way pager, or other like type of wireless device for sending and receiving e-mail. These devices are included in the disclosure for illustration purposes only. In practice any device capable of sending and receiving e-mail may be configured to implement various embodiments of the invention. The communication device 120 depicts a block diagram with exemplary elements often included in the desktop computer system 140, the notebook computer 150 or the wireless device 160.

Each of the devices depicted in FIG. 1—the desktop computer system 140, the notebook computer 150, the wireless device 160, and the communication device 120—are configured to send and receive e-mail. E-mail is often sent via the Internet 130, as shown in FIG. 1, but may be sent using any suitable type of network or communication connection known to those of ordinary skill in the art. The desktop computer system 140, the notebook computer 150 and the communication device 120 are shown as being connected by wired connection to the Internet 130. The wireless device 160 is shown connected to the Internet via a wireless link such as a cellular telephone link or a two-way pager link. These devices, or any equivalent devices used to practice the invention, may either be connected by a wired connection, by a wireless connection, or may be connected using a combination of wired and wireless links.

The communication device 120 may include typical information handling system hardware such as the processor 101. The processor 101 may be implemented as a central processing unit (CPU) containing circuitry or other logic configured to perform or control the processes, steps and activities involved in practicing the embodiments disclosed herein. The processor 101 may be embodied as either a microprocessor or an application specific integrated circuit (ASIC), may be a combination of two or more distributed processors, or any other circuitry or logic capable of carrying out commands or instructions, for example, the commands or instructions in e-mail application software or other communication software. In various embodiments, the processor 101 may run a computer program or routine which performs one or more of the activities depicted in FIGS. 2 and 3, or otherwise discussed herein or known to those of ordinary skill in the art.

The processor 101 is interconnected to internal memory 107 and storage memory 109. The components of the communication device 120 are typically interconnected via one or more buses, represented in FIG. 1 as bus 121. For example, the processor 101 is configured to communicate with internal memory 107 and storage memory 109 via the bus 121 or by way of another like type of wired or wireless communication links. Although the bus 121 is depicted as a single bus connecting all of the component parts of the system, the communication device 120 may include two or more separate buses each connected to a subset of the system components.

The internal memory 107, sometimes referred to as a local memory, may be any of several types of storage devices used for storing computer programs, routines, or code, including the instructions and data for carrying out activities of the various embodiments such as the activities discussed herein. The internal memory 107 and storage memory 109 may be implemented in any form suitable for storing data in a computer system, for example, as random access memory (RAM), read only memory (ROM), flash memory, registers, hard disk, or removable media such as a magnetic or optical disk, or other storage medium known in the art. Either of the memories 107 and 109 may include a combination of one or more of these or other such storage devices or technologies. The internal memory 107 and storage memory 109 may each be configured to store all or parts of a computer program product which performs the various activities in forwarding an e-mail in accordance with the various embodiments.

The communication device 120 also includes one or more input/output (I/O) units such as user display output 103 and user input/output (I/O) device 111. The user output display 103 may be implemented in the form of any visual output device, and may be interfaced to bus 121 by a graphics adapter (not shown). For example, the user output display 103 may be implemented as a cathode ray tube (CRT) monitor, a liquid crystal display (LCD) screen, or other like type of display screen or monitor. Typically, the output 103 (e.g., computer screen) is configured to display a view controlled by the processor 101 running the e-mail application software. The user output 103 may include other output devices in addition to a video monitor, such as one or more LED indicator lights, or audio speakers, or other like type of output units.

The communication device 120 typically includes one or more user I/O devices 111 such as a keyboard, a mouse, a tablet surface and pen, a microphone and speech recognition routine, or other like types of input/output devices known to those of ordinary skill in the art. The user I/O device 111 may be interfaced to bus 121 by an I/O interface (not shown) and may be connected either by cables or wirelessly to the communication device 120. The user output 103 and user I/O 111 may include other devices known to those of ordinary skill in the art and suitable for use with a computer system or communication device for communicating data and commands between the communication device 120 and a user of the device.

The communication device 120 is typically configured to include one or more data interface units 105 suitable for connecting to one or more networks such as the Internet 130, a local area network (LAN), a wide area network (WAN), the Public Switched Telephone System (PSTN), a wireless telephone network, or the like. The data interface unit 105 may include a wired and/or wireless transmitter and receiver. The data interface unit 105 may be implemented in the form of multiple units, including, for example, a modem and/or a network adapter. The communication device 120 may be connected via a network (e.g., LAN, WAN, or the like) to one or more other information handling systems, computers, dumb terminals, or telecommunications devices which participate in running or carrying out instructions from the application, for example, to implement the various activities disclosed herein.

Figure 2A:
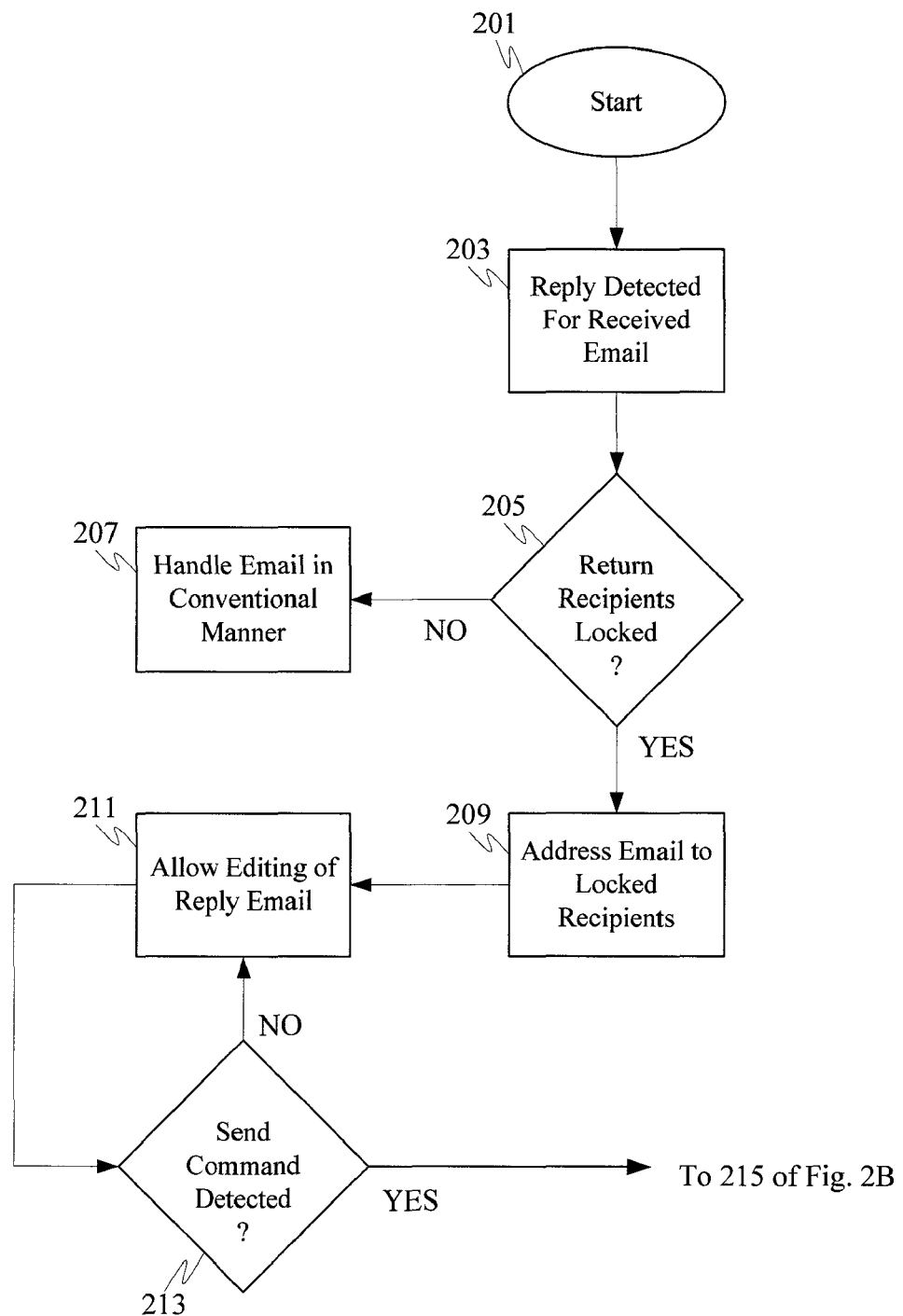
FIGS. 2A-2B depict an exemplary method for practicing various embodiments for controlling the distribution list of replies to e-mails having a locked distribution list.
Figure 2B:
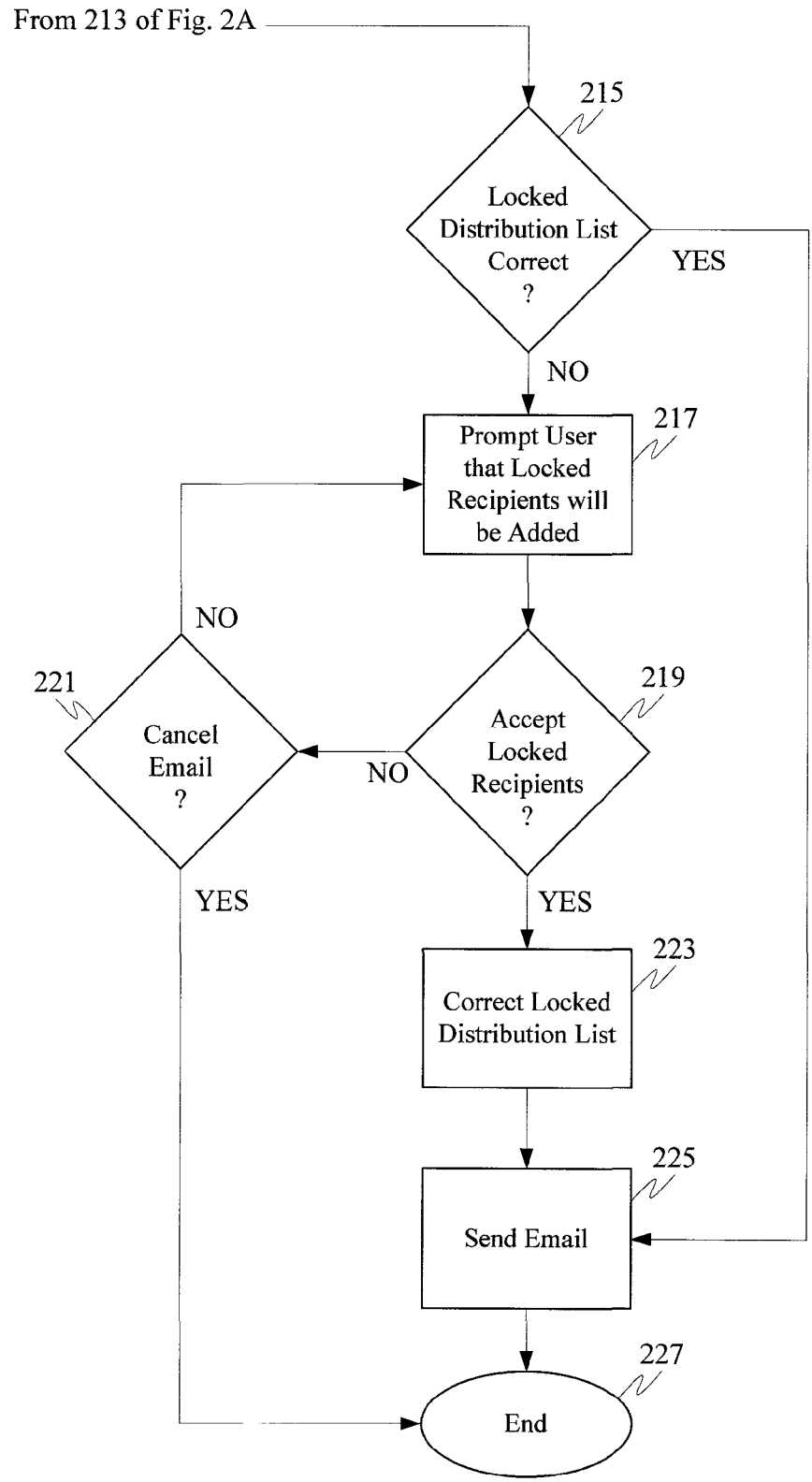

FIGS. 2A-2B depict an exemplary method 200 for practicing various embodiments for controlling the distribution list of replies to e-mails having a locked distribution list. The exemplary method 200 involves the handling of a received e-mail from another user which has a locked distribution list. For the purposes of this disclosure a "received e-mail" is any e-mail sent by one sender and received by another user. For the various embodiments herein it does not matter when the received e-mail was received. The received e-mail may have been received and opened for the first time recently, or may have been received at any time in the past and opened many times or not at all. The term "locked distribution list" implies restrictions or requirements for the e-mail address that can be used in replies based on the received e-mail—that is, the distribution list for a reply is locked and cannot be changed. The full distribution list of a reply e-mail may include some recipients that are not part of the locked distribution list.

Turning to FIG. 2A, the method begins at 201 and proceeds to 203 where it is detected that a reply is being made to a previously received e-mail. For example, to reply to a received e-mail, the e-mail application typically has a "Reply" or "Reply to All" button or control that results in the creation of a new e-mail addressed to some or all of the recipients of the original e-mail. E-mail applications also generally have the ability to forward an e-mail by selecting and clicking on a "Forward" command. Forwarding an e-mail differs from selecting the "Reply" option inasmuch as the user typically must enter in the e-mail addresses of the recipients for a forwarded e-mail. An e-mail created by clicking the "Reply" button is generally addressed to the sender of the received e-mail. An e-mail created by clicking the "Reply to All" button is generally addressed to the sender and all the recipients of the original e-mail. For the purposes of this disclosure, the term "reply e-mail" includes any e-mail created on the basis of a received e-mail. For example, a "reply e-mail" may be a reply to all or some of the recipients, and/or the sender, of the original e-mail, or a "reply e-mail" may be a forwarded e-mail based on the original received e-mail. The detection of a reply may occur in response to a received e-mail being opened (or selected by right-clicking on it), and the user choosing the "Reply," "Reply to All," or "Forward" control of the e-mail application. A reply e-mail may also be detected in response to a user opening the received e-mail and cutting and pasting (or otherwise copying) text from it into another e-mail being prepared. Other ways of detecting a reply to an e-mail known to those of ordinary skill in the art may be used in accordance with various embodiments. Once a reply e-mail is detected in 203 the method proceeds to 205.

In 205 it is determined whether the received e-mail is return recipient locked. The term "return recipient locked," as this term is used herein, means that a reply to the received e-mail must include the specified recipients and/or sender of the original received e-mail. A return recipient locked e-mail may also prohibit a reply e-mail from being sent to one or more specified e-mail addresses. A received e-mail that is return recipient locked may be labeled as being "locked" in order to signal to the user the return recipient locked status of the e-mail. A received e-mail that is labeled as "locked" may use the word "locked" in the label, or any other similar phrase or word such as: "protected," "return recipient locked," "reply distribution list limited," "reply restrictions," or any other like phrase or word intended to impart the meaning of return recipient locked to a user or to the e-mail application program. If it is determined in 205 that a received e-mail is not return recipient locked then the method proceeds along the "NO" branch to 207. In 207 the reply e-mail is handled in a conventional manner, with the sender not being limited regarding the recipients who must, or must not, receive the reply e-mail. If, however, it is determined in 205 that the reply e-mail is return recipient locked, then the method proceeds along the "YES" branch to 209.

In 209 the reply e-mail is addressed to the original recipients and/or the sender specified in the return recipient lock feature. Typically, the e-mail application program creates the reply distribution list for the reply e-mail in response to the reply e-mail being created, e.g., in response to the user hitting the "Reply" button. For example, the original sender of the e-mail could enable the return recipient lock feature and specify that any reply e-mail must be sent to all recipients (including himself, the sender) of the original e-mail, to some specified recipients, or only to himself. In yet another embodiment, the recipient lock feature could specify that the reply e-mail may be sent to certain recipients (either the original recipients or to others), but is prohibited from being sent to specified recipients. The recipients either specified to receive the reply, or specified to not receive the reply, may be known as the "locked recipients" or the "locked recipient distribution list" of the reply e-mail. The full distribution list may include recipients who are not subject to the locked distribution list, that is, are not required to receive the reply e-mail or prohibited from receiving it. Once the locked recipients have been added to the distribution list of the reply e-mail in 209 the method proceeds to 211.

In 211 the person sending the reply e-mail (e.g., one of the original recipients) is allowed to add text to the reply. For example, in response to a user hitting the "Reply" button to reply to an e-mail (or the "Forward" button), a new e-mail is created which includes the originally received e-mail, generally towards the bottom of the e-mail, with a space above it for new text. It should be noted that the original e-mail need not be in the same text area of the reply e-mail as the message of the reply e-mail. The original e-mail may be included in any of several different forms in the reply e-mail, for example in the text section mentioned above, as an attachment, an embedded object, or the like. Once the user has finished creating or editing the reply e-mail the method proceeds from 211 to 213. In 213 it is determined whether the user is sending the e-mail, e.g., whether a "Send" command by the user has been detected. If no "Send" command is detected the method proceeds from 213 back along the "NO" path to 211. However, if a "Send" command is detected in 213 the method proceeds along the "YES" path to 215 of FIG. 2B.

In 215 of FIG. 2B it is determined whether the locked distribution list is included in the reply e-mail before it is sent. The e-mail application or other logic checks to verify that all the locked recipients are being sent the e-mail, and that no recipients prohibited from being included are on the distribution list. If the locked distribution list is determined to be correct the method proceeds from 215 along the "YES" path to 225 and the reply e-mail is sent. However, if it is determined in 215 that the some of the locked recipients are not included (or some prohibited recipients are included) in the reply distribution list, then the method proceeds from 215 along the "NO" path to 217. In 217 a prompt is provided to the user, for example on a computer screen or other display, inquiring whether it is acceptable to add the missing locked recipients back to the distribution list (or remove prohibited recipients). The prompt may provide a message such as: "This e-mail requires that the following recipients be placed on the distribution list: (list of missing locked recipients). Is this acceptable?" Once the prompt has been displayed the method proceeds to 219.

In 219 it is determined whether it is acceptable to the sender to correct the locked distribution list. For example, in a Windows-based e-mail application the sender may be asked to click on "YES" or "NO," depending upon whether or not it is acceptable to include the required locked recipients. In at least one embodiment, the prompt to the user may be omitted and the recipients are simply added back, either visibly or as hidden recipients. That is, one or more recipients may be included in the distribution—but not necessarily displayed to the sender—even if the sender chooses not to accept the locked recipients. Referring back to 219, if it is determined that the sender does not accept the missing locked recipients the method proceeds from 219 along the "NO" path to 221. In 221 the sender is queried as to whether to cancel the reply e-mail or not. If the sender decides not to cancel the e-mail the method proceeds from 221 along the "NO" path back to 217 to again prompt the user about adding back the necessary locked recipients. However, if it is determined in 221 that the user wishes to cancel the sending of the reply e-mail, the method proceeds from 221 along the "YES" path to 227 and ends.

Referring back to 219, if the sender indicates that he is willing to accept the locked recipients missing from the locked distribution list (or delete prohibited recipients), the method proceeds from 219 along the "YES" path to 223 to add back the missing locked recipients, or otherwise correct the locked distribution list. Some embodiments may allow recipients in addition to the locked recipients to be on the distribution list of the reply e-mail. Once the correct locked recipients are associated with the reply e-mail the method proceeds to 225 to send the reply e-mail. Once the reply e-mail has been sent to the locked recipients in 225 the method proceeds to 227 and ends.

Figure 3:
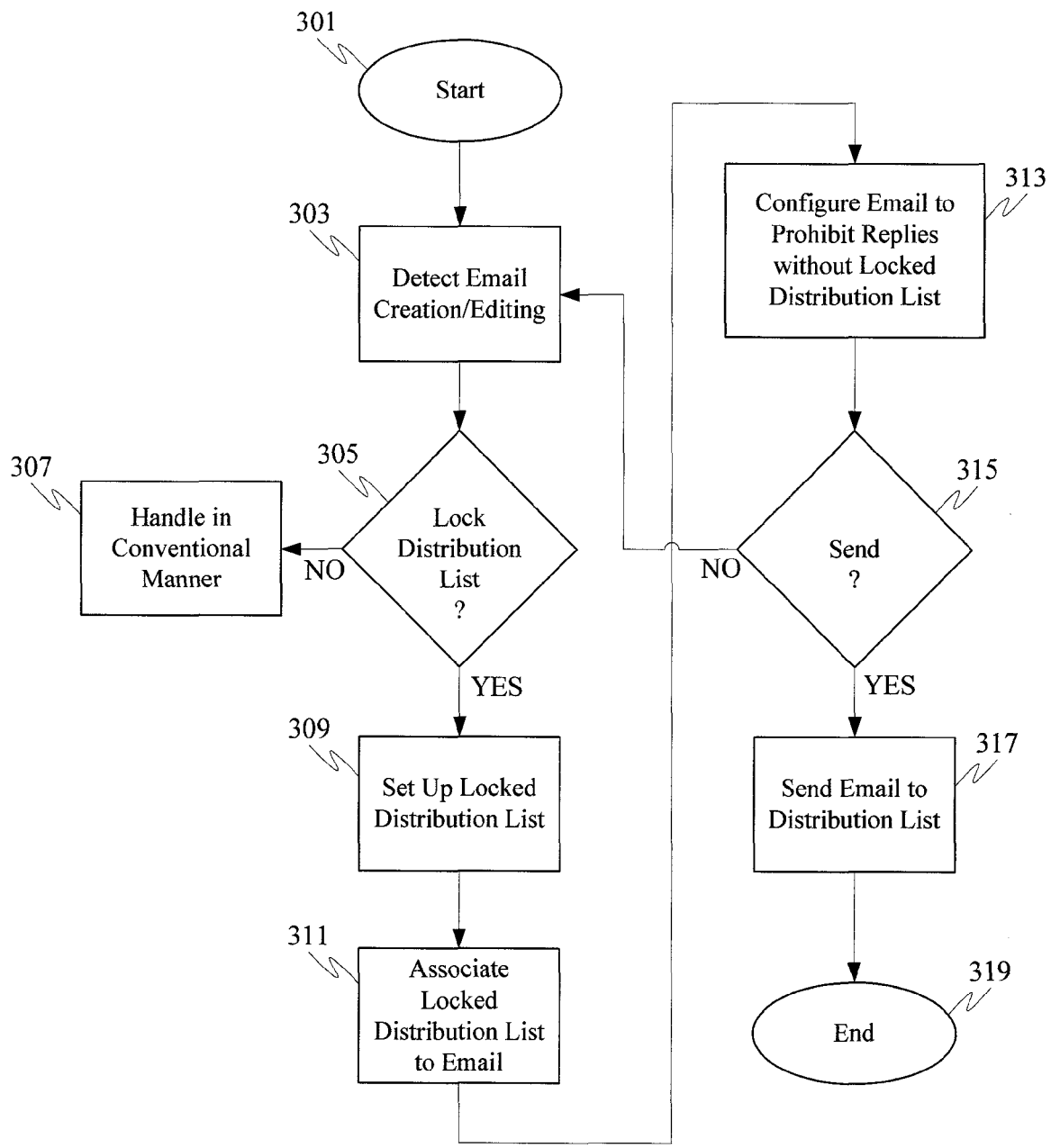
FIG. 3 depicts an exemplary method for practicing various embodiments of creating, editing and sending e-mails with a locked distribution list.

FIG. 3 depicts an exemplary method 300 for practicing various embodiments of creating, editing and sending e-mails with a locked distribution list. The method begins at 301 and proceeds to 303 where it is determined that an e-mail is being created or edited for sending. The method then proceeds to 305 where it is determined whether or not the e-mail is to be sent using a locked distribution list. As discussed above, a locked distribution list restricts (either requires or prohibits) the e-mail addresses in a reply e-mail sent in response to a received e-mail. For an e-mail being created with a locked distribution list, it should be noted that not all the addressed recipients of the e-mail need to be subject to the locked distribution list. In at least one embodiment, the person creating the e-mail may specify that one or more of the recipients of the e-mail are not subject to the locked distribution list—that is, they can reply to whomever they please. In other embodiments, some recipients may not be subject to the locked distribution list, or may override the restrictions, by virtue of their status, e.g., system administrators, specified company executives, or the like. However, in a typical scenario the locked distribution list coincides with the distribution list of the e-mail so that all the e-mail address on the distribution list are subject to the restrictions of the locked distribution list.

If it is determined in 305 that the e-mail is to be created without a locked distribution list then the method proceeds from 305 along the "NO" path to 307 and the e-mail is created in a conventional manner. However, if it is determined in 305 that the e-mail is to include a locked distribution list then the method proceeds from 305 along the "YES" path to 309. In 309 the e-mail application program receives inputs for editing and addressing the e-mail. Typically, as part of initially creating the e-mail to be sent the user sets up the locked distribution list, specifying one or more e-mail addresses that shall be required in any reply to the e-mail as well as those that shall be prohibited. In another exemplary scenario, a user may receive an e-mail that is not return recipient locked and want to forward it to others with a locked distribution list. In an alternative embodiment the sender may include one or more blind copy (BCC) recipients in the e-mail being created. These BCC recipients can be included as part of the locked distribution list, without being shown as having received the e-mail to the other recipients. In this embodiment, when a reply is sent from one of the recipients, a BCC recipient included on the locked distribution list also gets a copy of that reply. Once the locked distribution list has been set up the method proceeds to 311 to associate the locked distribution list to the e-mail being created. Associating the locked distribution list may entail encoding the e-mail in a certain manner, storing the locked distribution list as part of the e-mail or as an attachment, setting a toggle, a predefined bit, or a flag of the e-mail, or otherwise indicating that replies to the e-mail are subject to the locked distribution list. The e-mail may also be labeled as locked at this time by including a message, a label, a special flag, or other indicator of its status as a recipient locked e-mail. Once the locked distribution list has been associated to the e-mail the method proceeds to 313.

In 313 the e-mail is configured to prohibit replies which do not conform to the requirements of the locked distribution list. In one embodiment the e-mail is encoded using an encryption key calculated from parameters derived from the locked distribution list. If the locked distribution list is altered or deleted the encryption key will not function to unlock the e-mail for purposes of sending a reply. Various other embodiments may entail other methods of configuring the e-mail to restrict replies based on a locked distribution list may be used, as are known by those of ordinary skill in the art. Once the e-mail has been configured to be locked the method proceeds from 313 to 315.

In 315 it is determined whether the e-mail is ready to be sent. For example, the e-mail application program can detect that the e-mail is to be sent in response to the sender hitting a "Send" button of the e-mail program. Alternatively, this may be determined by providing a prompt to the sender, such as: "Ready to send e-mail?" If, in 315, it is determined that the e-mail is not yet ready for sending the method proceeds from 315 along the "NO" path back to 303 for further editing of the e-mail text or addresses of the recipients. However, once the e-mail has been determined as being ready for sending (e.g., the user has hit the "Send" button) the method proceeds from 315 along the "YES" path to 317. In 317 the e-mail is sent to the distribution list provided in the e-mail. The method then proceeds to 319 and ends.

Various embodiments may be implemented in, or in conjunction with, a number of different e-mail applications, including but not limited to: Lotus Notes, Microsoft Outlook, Eudora, Mozilla Thunderbird, Pegasus, Claris, Blitzmail, Pronto Mail, Mutt, Pine, or other like types of e-mail applications known to those of ordinary skill in the art. In some embodiments, several or all of the functions outlined above for practicing the invention may be carried out either in the e-mail application program itself or by an application program, routine or other logic working in conjunction with the e-mail application. Various "buttons" are mentioned throughout the specification, for example, the "Reply" button, "Reply to All" button, "Forward" button, "Send" button, and so on. The term "button" as used herein means any control of a computer application program that a user may select, control or toggle. A button may be a menu button, a button on a drop-down menu, a button on a pop-up window prompt, or any other such control subject to user input. For example, a user may control a GUI-based computer application program by clicking on a "button" with a mouse or other user input device.

The invention may be implemented with any sort of processing units, processors and controllers (e.g., processor 101 of FIG. 1) capable of performing the stated functions and activities. For example, the processor 101 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the storage memory 109, e.g. hard disk, CD, flash memory, ram, or other computer readable medium as recognized by one of ordinary skill in the art, or the computer software programs may be transmitted wirelessly to the processing unit.

An e-mail application for implementing the various embodiments may operate with any type of operating system (OS). For example, e-mail application programs commonly run on graphical user interface (GUI) based operating systems such as Windows® Millenium Edition, Windows® XP, Linux, or the like. The computer application or software programs can aid or perform the steps and activities described above. For example computer programs in accordance with at least one exemplary embodiment may include: source code for associating a locked distribution list to a first e-mail; source code for sending the first e-mail to e-mail addresses on the locked distribution list; source code for configuring the first e-mail and the locked distribution list so that a reply e-mail must include the locked distribution list; as well as other features of the various embodiments.

The use of the word "exemplary" in this disclosure is intended to mean that the embodiment or element so described serves as an example, instance, or illustration, and is not necessarily to be construed as preferred or advantageous over other embodiments or elements. The term "recipients," as this term is used herein, is intended to mean one that receives an e-mail. For ease of explanation, a "recipient" has been discussed in terms of a person receiving an e-mail. In practice, however, an e-mail application program (e.g., MicroSoft Outlook) actually receives the e-mail and displays it for the benefit of a person, with the program typically being under the control of the person. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of locking a distribution list of a reply e-mail, the method comprising:

associating a locked distribution list to a first e-mail, said locked distribution list including a plurality of e-mail addresses; and sending the first e-mail to the plurality of e-mail addresses on the locked distribution list;

wherein said first e-mail and the locked distribution list are configured so that the reply e-mail must include the plurality of e-mail addresses on the locked distribution list; and wherein the locked distribution list specifies a prohibited e-mail address that is not to receive the reply e-mail.

2. The method according to claim 1, wherein the locked distribution list includes a sender of the first e-mail.

3. The method according to claim 2, wherein the locked distribution list includes all recipients of the first e-mail.

4. The method according to claim 1, wherein the locked distribution is labeled with a locked indicator in the first e-mail.

5. The method according to claim 1, wherein the locked distribution list includes a blind copy recipient not shown on a full distribution list of the e-mail, the blind copy recipient being specified to receive the reply e-mail.

6. The method according to claim 1, further comprising:
encoding the first e-mail using an encryption key based on the locked distribution list.

7. The method according to claim 6, wherein the first e-mail must be decoded using the encryption key for said reply e-mail.

8. A software product comprising an electronically readable medium including a program of instructions, wherein the program of instructions upon being executed on a device causes the device to:
associate a locked distribution list to a first e-mail, said locked distribution list including a plurality of e-mail addresses; and
send the first e-mail to the plurality of e-mail addresses on the locked distribution list;
wherein said first e-mail and the locked distribution list are configured so that the reply e-mail must include said plurality of e-mail addresses on the locked distribution list; and
wherein the locked distribution list specifies a prohibited e-mail address that is not to receive the reply e-mail.

9. The software product according to claim 8, wherein the locked distribution list includes a sender of the first e-mail.

10. The software product according to claim 9, wherein the locked distribution list includes all recipients of the first e-mail.

11. The software product according to claim 8, wherein the locked distribution is labeled with a locked indicator in the first e-mail.

12. The software product according to claim 8, wherein the locked distribution list includes a blind copy recipient not shown on a full distribution list of the e-mail, the blind copy recipient being specified to receive the reply e-mail.

13. The software product according to claim 8, wherein the program of instructions upon being executed, further causes the device to:
encode the first e-mail using an encryption key based on the locked distribution list.

14. The software product according to claim 13, wherein the first e-mail must be decoded using the encryption key for said reply e-mail.

15. A system configured for locking a distribution list of a reply e-mail, the system comprising:
an electronically readable storage medium configured to store an e-mail application program;
a user input device responsive to user inputs for associating a locked distribution list to a first e-mail, said locked distribution list including a plurality of e-mail addresses; and
a data interface unit configured to be connected to a network for sending the first e-mail to the plurality of e-mail addresses on the locked distribution list;
wherein said first e-mail and the locked distribution list are configured so that the reply e-mail must include the plurality of e-mail addresses on the locked distribution list; and
wherein the locked distribution list specifies a prohibited e-mail address that is not to receive the reply e-mail.

16. The system according to claim 15, wherein the user input device is a mouse configured to manipulate a cursor; and
wherein a full distribution list of the reply e-mail includes a new recipient not included in said locked distribution list.

17. The method according to claim 1, wherein a full distribution list of the reply e-mail includes a new recipient not included in said locked distribution list.

18. The software product according to claim 8, wherein a full distribution list of the reply e-mail includes a new recipient not included in said locked distribution list.

* * * * *